(12) United States Patent
Lanzkron (10) Patent No.: US 7,880,667 B2
(45) Date of Patent: Feb. 1, 2011

(54) METHODS AND APPARATUS FOR USING INTERFEROMETRY TO PREVENT SPOOFING OF ADS-B TARGETS

(75) Inventor: Paul J. Lanzkron, Brighton, MA (US)

(73) Assignee: Raytheon Company, Waltham, MA (US)

( * ) Notice: Subject to any disclaimer, the term of this patent is extended or adjusted under 35 U.S.C. 154(b) by 280 days.

(21) Appl. No.: 12/129,835

(22) Filed: May 30, 2008

(65) Prior Publication Data

US 2009/0322586 A1 Dec. 31, 2009

Related U.S. Application Data

(60) Provisional application No. 60/941,370, filed on Jun. 1, 2007.

(51) Int. Cl.
*G01S 13/74* (2006.01)
*G01S 13/91* (2006.01)
*G01S 13/93* (2006.01)
*G01S 7/40* (2006.01)
*G01S 13/00* (2006.01)

(52) U.S. Cl. .............. 342/37; 342/29; 342/30; 342/32; 342/36; 342/165; 342/173; 342/175; 342/195

(58) Field of Classification Search ............. 342/13–20, 342/29–51, 165–175, 195, 118, 127, 134–158, 342/450–465; 340/500, 531, 539.1, 539.11, 340/539.13, 540, 686.1–686.6; 701/1, 3, 701/200, 207, 213–216; 455/403, 404.1, 455/404.2
See application file for complete search history.

(56) References Cited

U.S. PATENT DOCUMENTS

| | | | | |
|---|---|---|---|---|
| 4,213,128 A | * | 7/1980 | Longinotti | 342/19 |
| 4,328,499 A | | 5/1982 | Anderson et al. | |
| 4,638,320 A | | 1/1987 | Eggert et al. | |
| 5,426,434 A | * | 6/1995 | Bishop | 342/45 |
| 5,786,773 A | * | 7/1998 | Murphy | 701/215 |

(Continued)

FOREIGN PATENT DOCUMENTS

EP  1 884 908 A  2/2008

(Continued)

OTHER PUBLICATIONS

Notification Concerning Transmittal of International Preliminary Report on Patentability (Chapter 1 of the Patent Cooperation Treaty), PCT/US2008/065227 mailed Dec. 10, 2009, 1 page.

(Continued)

*Primary Examiner*—Bernarr E Gregory
(74) *Attorney, Agent, or Firm*—Daly, Crowley, Mofford & Durkee, LLP (57) ABSTRACT

Methods and apparatus for preventing spoofing of targets, such as aircraft, in an air traffic control system. In one embodiment, first and second antennas at respective ground stations can be used to receive a signal transmitted by an aircraft from which a phase signal can be generated. A position of the aircraft generate can be generated from peaks and troughs in the phase signal due to movement of the aircraft. The determined position can be compared to a position reported by the aircraft to identify spoofing of the target.

15 Claims, 8 Drawing Sheets

U.S. PATENT DOCUMENTS

| | | | |
|---|---|---|---|
| 5,999,116 A | 12/1999 | Evers | |
| 6,480,140 B1 * | 11/2002 | Rosefsky | 342/14 |
| 6,538,597 B1 * | 3/2003 | Steudel | 342/17 |
| 6,952,631 B2 | 10/2005 | Griffith et al. | |
| 7,127,683 B2 * | 10/2006 | Royalty | 701/3 |
| 7,423,590 B2 * | 9/2008 | Smith | 342/450 |
| 7,471,238 B2 * | 12/2008 | Lillo et al. | 701/216 |
| 7,495,612 B2 * | 2/2009 | Smith | 342/450 |
| 7,697,919 B1 * | 4/2010 | Stratton et al. | 455/404.2 |
| 2003/0060941 A1 | 3/2003 | Griffith et al. | |
| 2006/0119515 A1 * | 6/2006 | Smith | 342/450 |
| 2008/0088508 A1 | 4/2008 | Smith | |

FOREIGN PATENT DOCUMENTS

| | | | |
|---|---|---|---|
| EP | 1 912 077 A | 4/2008 | |
| WO | WO 2005/085898 A | 9/2005 | |

OTHER PUBLICATIONS

Written Opinion of the International Searching Authority, PCT/US2008/065227 mailed Dec. 10, 2009, 10 pages.
Notification of Transmittal of the International Search Report and the Written Opinion of the International Searching Authority, or the Declaration; PCT/US2008/065227 dated Mar. 20, 2009.
Written Opinion of the International Searching Authority; PCT/US2008/065227 dated Mar. 20, 2009.
Never W H L et al: "Wide Area Multilateration Report on EATMP TRS 131/04 Version 1.1", Internet Citation [Online] Aug. 1, 2005, pp. 1-94, XP007907348. Retrieved from the Internet: URL:http://www.eurocontrol.int/surveillance/gallery/content/public/documents/WAMP__study__report__1__1.pdf., Chapters 1,3, Sections 2.1.5, 2.1.5.3, 7.4 Figure 20.

* cited by examiner

Signal Strength at Angles to the Target

*FIG. 3B*

Signal Strength Overlaid with Possible Target Locations

METHODS AND APPARATUS FOR USING INTERFEROMETRY TO PREVENT SPOOFING OF ADS-B TARGETS

CROSS REFERENCE TO RELATED APPLICATIONS

The present application claims the benefit of U.S. Provisional Patent Application No. 60/941,370, filed on Jun. 1, 2007, which is incorporated herein by reference.

BACKGROUND

As described by the FAA (Federal Aeronautics Administration), ADS-B is an air traffic control system that uses signals from Global Positioning Satellites (GPS), instead of radar data, to keep aircraft at safe distances from one another. The ADS-B system provides air traffic controllers and pilots with accurate information that will help keep aircraft safely separated in the sky and on runways. With ADS-B some of the responsibility for keeping safe distances between aircraft is shifted from air traffic controllers on the ground to pilots who will have displays in the cockpits showing air traffic around them.

SUMMARY

The present invention provides methods and apparatus for preventing spoofing by a target for an air traffic control system. A signal transmitted by the target is collected at two or more different locations to determine the angle to the target. As the target moves through space, it traverses through peaks and troughs in the generated antenna pattern that can be compared to the reported positions to identify spoofing of the target.

In one aspect of the invention, an exemplary method comprises receiving a signal from a target at first and second ground stations forming part of an air traffic control system, determining a phase difference signal between the signal received at the first ground station and the signal received at the second ground station, determining peaks and troughs in the phase difference signal due to movement of the target, comparing the determined peaks and troughs in the phase difference signal with a phase difference derived from a position of the target reported by the target, and identifying spoofing of the target from the comparison of the determined phase different signal and the signal derived from the position of the target reported by the target.

The method can further include one or more of the following features: comparing at selected times the determined peaks and troughs in the phase difference signal with a phase difference derived from a position of the target reported by the target to check for consistency between target reported location and possible target locations, the air traffic control system is an ADS-B system, the target is an aircraft, the position of the target reported by the target was reported over a 1090ES link, determining possible target locations from the signal received at the first ground station and the signal received at the second ground station, and determining spoofing of the target if the position of the target reported by the target is not of the possible target locations determined from the signal received at the first ground station and the signal received at the second ground station.

In another aspect of the invention, an exemplary air traffic control system comprises a ground station to communicate with aircraft, the ground station including first and second antennas, a target spoofing detection module to detect spoofing by an aircraft if a position of the aircraft reported by the aircraft is not one of possible target locations determined from a signal from the aircraft received at the first ground station and received at the second ground station.

The system can further include one or more of: the target spoofing detection module is configured to determine a phase difference signal between the signal received at the first antenna and the signal received at the second antenna, compare the determined phase difference signal with a phase difference signal derived from a position of the aircraft reported by the aircraft, and to identify spoofing of the aircraft from the comparison of the determined phase different signal and the signal derived from the position of the aircraft reported by the aircraft, the target spoofing detection module is configured to compare at selected times the determined peaks and troughs in the phase difference signal with a phase difference derived from a position of the aircraft reported by the aircraft to check for consistency between aircraft reported location and possible aircraft locations, the air traffic control system is an ADS-B system, and the position of the aircraft reported by the aircraft was reported over a 1090ES link.

In a further aspect of the invention, an exemplary article comprises a computer readable medium containing stored instructions that enable a machine to perform the steps of: receiving target phase information from a target at first and second ground stations forming part of an air traffic control system each of which has a phase determining module, comparing the phases determined at each of these ground stations to determine a very small number of locations in space where the target could be located, and monitoring these locations over time to determine the unique location of the target.

BRIEF DESCRIPTION OF THE DRAWINGS

The foregoing features of this invention, as well as the invention itself, may be more fully understood from the following description of the drawings in which.

DETAILED DESCRIPTION

Before describing exemplary embodiments of the invention, some introductory information is provided. In general, ADS-B systems work by having aircraft receive GPS signals and use them to determine the aircraft's precise location in the sky. The aircraft's avionics system uses this position for precise navigation, and also broadcasts it along with other data from the aircraft's flight monitoring system, such as the type of aircraft, its speed, its flight number, and whether it is turning, climbing, or descending. The data is automatically broadcast by the aircraft transponder periodically (typically once or twice a second) using either the 1090 MHz Mode S Extended Squitter (1090ES) or the 978 MHz Universal Access Transceiver (UAT). Both technologies are approved for use in the National Airspace System (NAS), with 1090ES being predominantly used by the commercial airlines and UAT being used by the General Aviation community.

Aircraft equipped to receive the data, and ADS-B ground stations up to 200 miles away, receive these broadcasts. ADS-B ground stations add radar-based targets for non-ADS-B-equipped aircraft to the mix and send the information back up to all equipped aircraft on both frequencies—this function is called Traffic Information Service-Broadcast (TIS-B). ADS-B ground stations also send aircraft information from the national weather service and flight information, such as temporary flight restrictions—this is called Flight Information Service-Broadcast (FIS-B).

Pilots see this information on their cockpit traffic display screens. Air traffic controllers will see the information on displays they are already using, when adapted to process this new data source.

When properly equipped with ADS-B, both pilots and controllers see the same real-time displays of air traffic. Pilots will have much better situational awareness than in conventional systems because they will know where their own aircraft are with greater accuracy, and their displays will show them the aircraft in the air around them. Pilots will be able to maintain safe separation from other aircraft with fewer instructions from ground-based controllers. At night and in poor visual conditions, pilots will also be able to see where they are in relation to the ground using on-board avionics and terrain maps.

ADS-B also increases airport and air corridor capacity, because the more accurate tracking means aircraft will be able to fly safely and more predictably with less distance between them. And, because ADS-B accuracy also means better predictability, air traffic controllers will be better able to manage the air traffic arriving and departing from congested airports, resulting in even more gains in capacity.

While radar technology has advanced, radar systems occasionally have problems discriminating airplanes from migratory birds and rain "clutter." Secondary surveillance radar (SSR) systems can determine what objects are because they interrogate transponders; however, both primary and secondary radars are very large structures that are expensive to deploy, need lots of maintenance, and require the agency to lease real estate to situate them.

The automatic function of ADS-B eliminates the need for action by a pilot and/or air traffic controller for the information to be issued. The system has dependent surveillance aspect in that the acquired surveillance-type information depends on the navigation and broadcast capability of the source.

An ADS-B system includes a transmitter that includes message generation and transmission functions at the source and a receiver that includes message reception and report assembly functions at the receiving vehicle or ground system.

An Air Traffic Control Radar Beacon System (ATCRBS) system is used in air traffic control (ATC) to enhance radar monitoring of aircraft and aircraft separation. The system acquires information for monitored aircraft and provides this information to the air traffic controllers. This information can be used to identify returns from aircraft and to distinguish those returns from ground clutter.

The system includes aircraft transponders and secondary surveillance radars (SSRs), installed at ATC locations. The SSR transmits interrogations and listens for replies. The aircraft transponders receive interrogations and determine whether to reply.

An ATC ground station typically includes a primary surveillance radar that transmits pulses and receives signal returns from aircraft and a secondary surveillance radar (SSR) having a main antenna and/or an omnidirectional antenna. A primary receives signal return from a target while the SSR receives responses actively transmitted by an aircraft or other object. The relatively high frequency pulses are known as interrogation.

The SSR system scans the area and transmits interrogations over the scan area. The interrogations specify what type of information a replying transponder should send by using a system of modes, e.g., mode 1, mode 2, mode 3/A, mode 4 (IFF), Mode 5, and mode C. Mode S is a discrete selective interrogation that facilitates TCAS for civil aircraft.

A TIS-B system enhances ADS-B systems by providing known aircraft information to pilots. TIS-B is useful for an ADS-B link in airspace where not all aircraft are transmitting ADS-B information. The ground ADS-B station transmits surveillance target information on the ADS-B data link for unequipped aircraft or aircraft transmitting only on another ADS-B link.

The multilink gateway service is a companion to TIS-B for achieving interoperability in low altitude terminal airspace. Aircraft that fly at high altitudes are equipped with 1090ES capability. Aircraft flying at lower altitudes typically have UAT (Universal Access Transceiver), which does not provide air-to-air ADS-B capability. When both types of ADS-B link are in use, ADS-B ground stations use ground-to-air broadcasts to relay ADS-B reports received on one link to aircraft using the other link.

One issue for ADS-B is the capacity for carrying message traffic from aircraft, as well as allowing a link, such as a radio channel, to support legacy systems. The more message traffic there is, the less aircraft can be supported due to bandwidth limitations.

Another issue in ADS-B system is that the increasing volume of air traffic and the emerging use of Automatic Dependent Surveillance creates frequency congestion in the 1090 MHz spectrum which reduces the efficacy of airborne and ground-based surveillance. Reduction in frequency congestion has been a motivation for development of Mode S radar, as well as the development of monopulse SSR radar.

Figure 1:
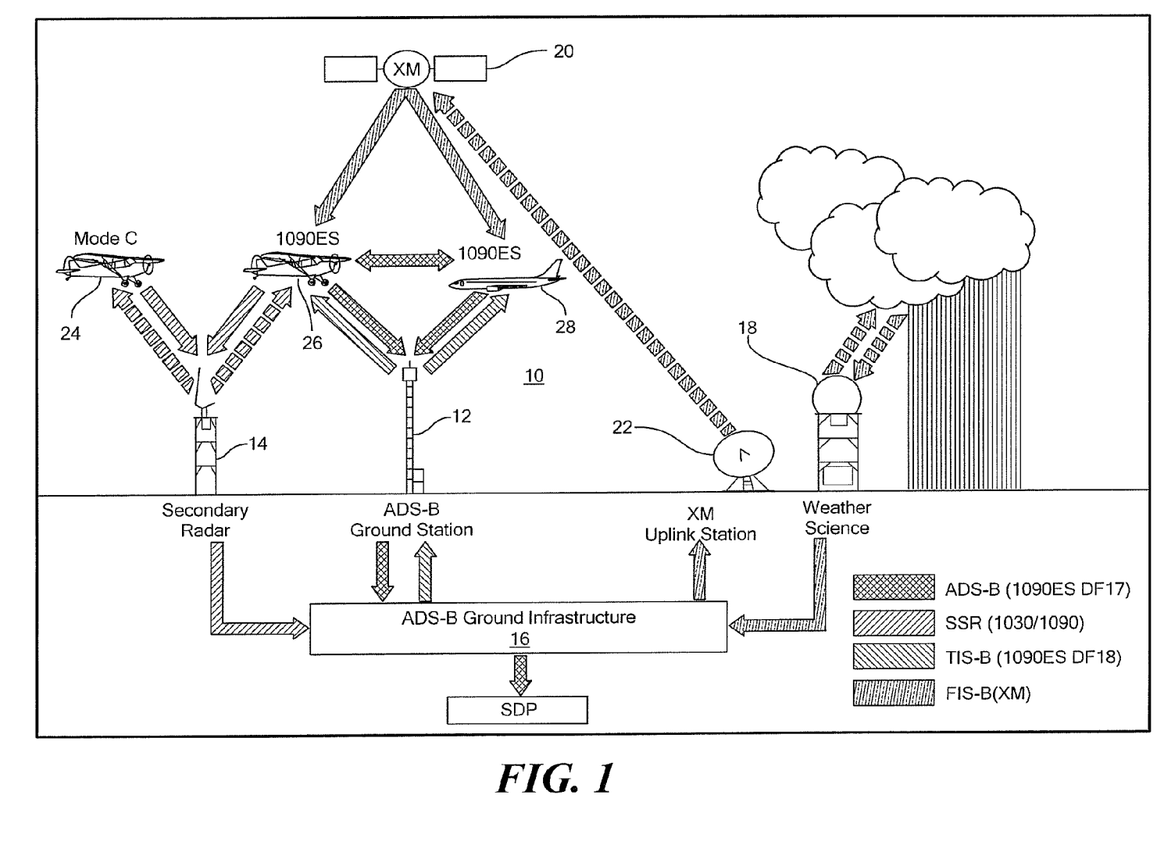
FIG. 1 is a schematic diagram of an air traffic control system having target spoofing detection.

FIG. 1 shows an exemplary ADS-B system 10 including an ADS-B ground station 12 and a secondary surveillance radar (SSR) 14 coupled via ADS-B ground infrastructure 16. The ADS-B system 10 includes a target spoofing detection module 17 to detect spoofing of targets in accordance with exemplary embodiments of the invention described in further detail below.

A weather service installation 18 communicates with an XM satellite 20 via an antenna 22. The weather service installation 18 and the antenna uplink 22 are coupled to the ADS-B ground infrastructure 16.

The SSR 14 communicates via Mode C for some aircraft 24 and via 1090ES for other aircraft 26. The ADS-B 12 communicates with aircraft 26 while various aircraft 26, 28 can communicate directly with each other. Some of the aircraft also receive messages from the XM satellite 20.

In an exemplary embodiment, 1090ES is used for ADS-B and TIS-B communication and XM satellite radio for FIS-B communication with a distributed equipment network on the ground. This provides increased capacity, accelerated equipage, and reduced deployment cost compared with known systems.

A single link on 1090ES provides a number of advantages. Antennas and transceivers for UAT link processing and redundant 1090ES transmitters for ADS-R availability is not required at the ground station. In addition, ADS-R of UAT on 1090ES results in equivalent congestion to all aircraft on 1090ES. Further, 1090ES equipage based on Mode S transponders reduces ATCRBS interference. By using a single link, there is no possibility of amplification and rebroadcast of invalid signals, i.e., no spoofing. Also, aircraft receive reports from other aircraft regardless of ground system coverage or failure. UAT aircraft retain Mode C transponders for operation with SSR and TCAS.

Figure 1A:
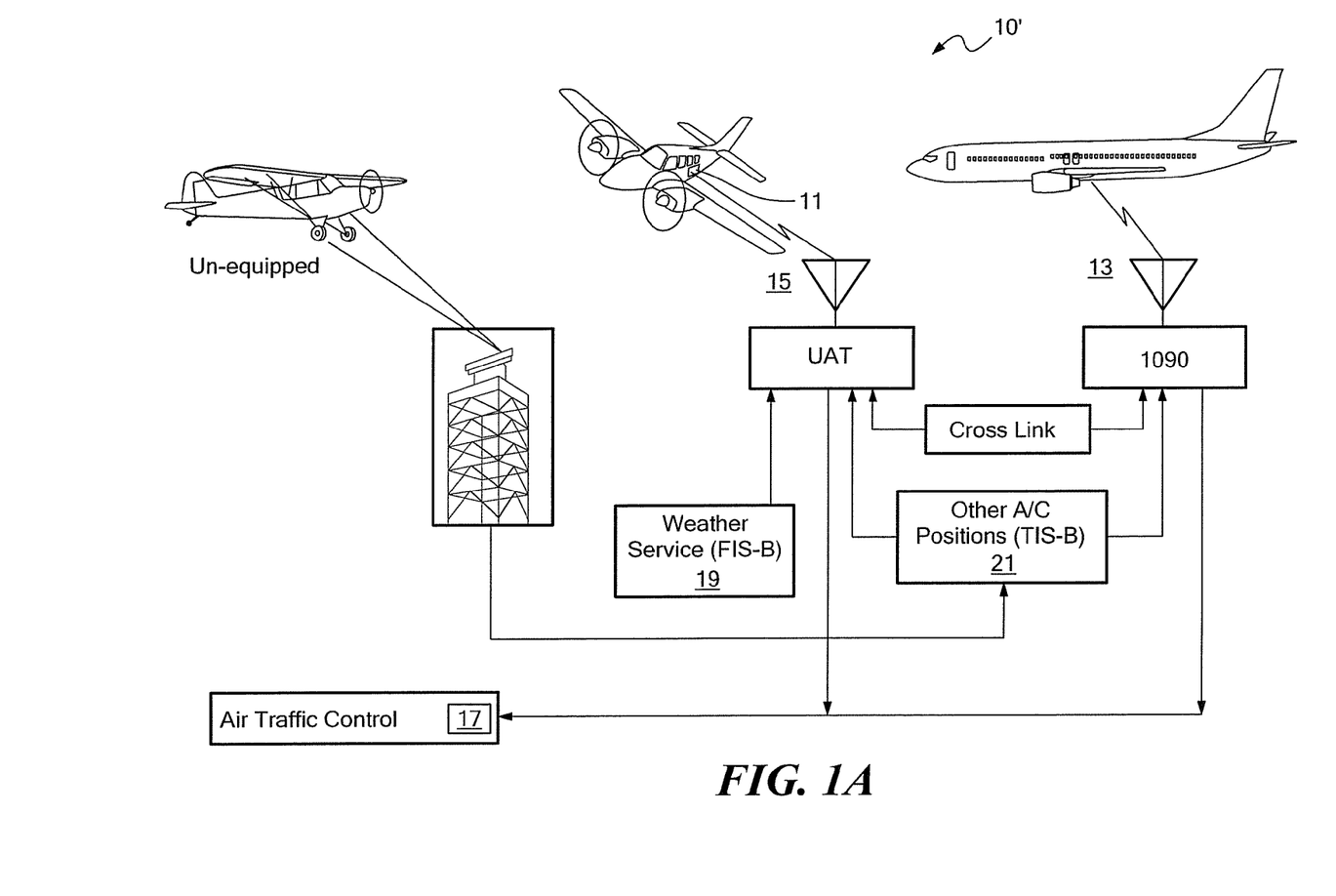
FIG. 1A is a schematic diagram of a multi-link air traffic control system having target spoofing detection.

FIG. 1A shows a multi-link ADS-B air traffic control system 10' having target spoofing detection 17 in accordance with exemplary embodiments of the invention. The system 10' supports aircraft with universal access transceivers (UAT) 11 for communicating with a ground station. Air traffic information is rebroadcast using an ADS-R function via 1090 link. ADS-R interconnects the 1090ES link 13 and the UAT link 15. The FIS-B 19 weather information is also provided via UAT communication. TIS-B 21 provides aircraft traffic information to aircraft. The operation and configuration of dual-link ADS-B systems is well known to one of ordinary skill in the art.

While inventive embodiments of target spoofing detection is shown and described in conjunction with single and multi-link ADS-B type air traffic control systems, it is understood that exemplary embodiments of inventive spoofing detection are applicable to air traffic control systems in general in which it is desirable to determine a deviation from a target location reported by the target and actual target location.

Figure 2:
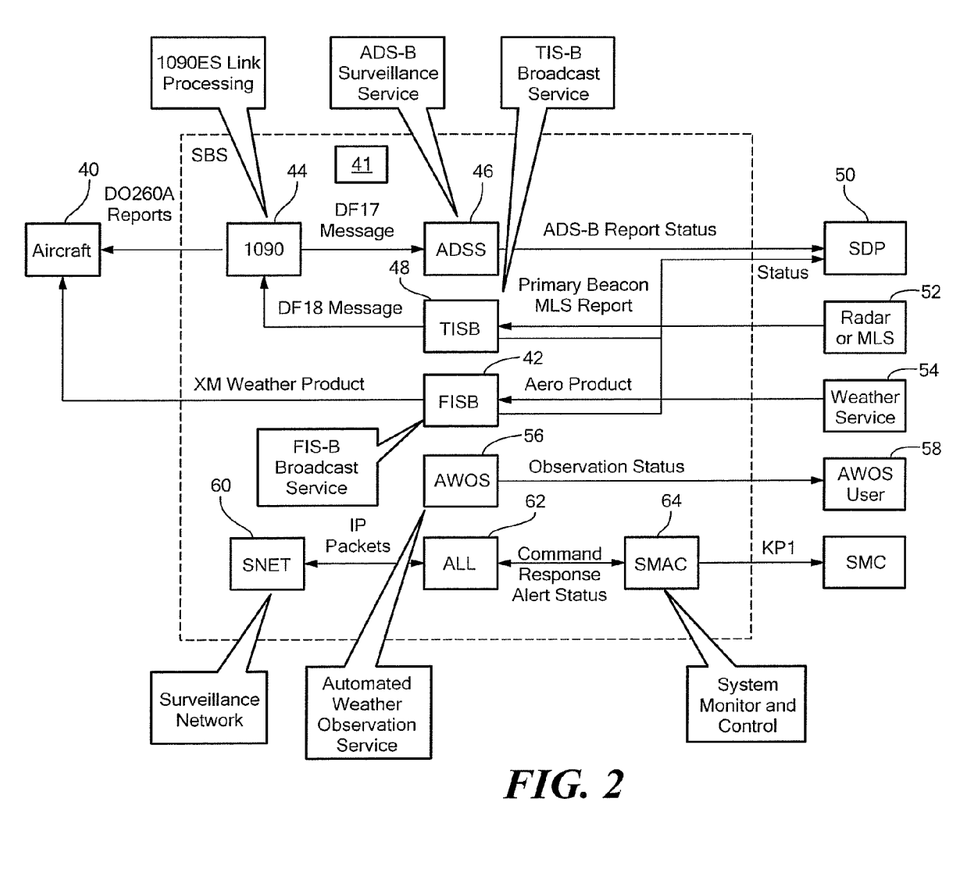
FIG. 2 is a block diagram showing further detail for the air traffic control system of FIG. 1.

FIG. 2 shows further details of the system of FIG. 1, which includes a target spoofing detection module 41 in accordance with exemplary embodiments of the invention. The system is partitioned by capability with minimal dependencies allowing independent integration, test, and deployment of ADS-B surveillance, TIS-B and FIS-B services. Link specific processing is separate to minimize the impact of link enhancements.

An aircraft 40 receives XM weather information from an FISB service 42 and communicates via a 1090 MHz link processor 44 with an ADS-B report and status (ADSS) service 46 and a TISB service 48. The ADSS service 46, the TISB service 48, and the FISB service 42 are coupled to the SDP 50. The TISB service 48 receives weather radar information and/or MLS from a service 52. The weather service 54 provides information to the FISB service 42.

A AWOS (automated weather observation service) user 56 receives observation and status information from an AWOS service 58. A surveillance network 60 exchanges packet data with an ALL service 62, which exchanges command, response, alert, and status information with a SMAC (system monitor and control) service 64.

As described above, the ADS-B system depends on aircraft GPS data being transmitted to ground stations via a 1090 MHz broadcast. The system should have the ability to detect spoofing targets. As used herein, a target spoofs when it transmits an incorrect GPS location for itself. The transmission of incorrect data can be due to a malfunctioning GPS of the target, or the system may be under attack by an actor intentionally transmitting false messages. The system should be able to detect that the target is not where the target says it is.

In one aspect of the invention, the system includes the use of interferometry by using the same signal collected at two or more different locations to determine the angle to the target. If the antennas are relatively close together a single direction is reported, but over a relatively large angle. If the antennas are far apart then the angles are relatively far apart. This allows a number of possible directions. As the target moves through space, it traverses through peaks and troughs in the generated antenna pattern in predictable ways. By comparing the peaks and troughs of the signals received from the target to reported positions for the target, a spoofing target can be determined.

Figure 3:
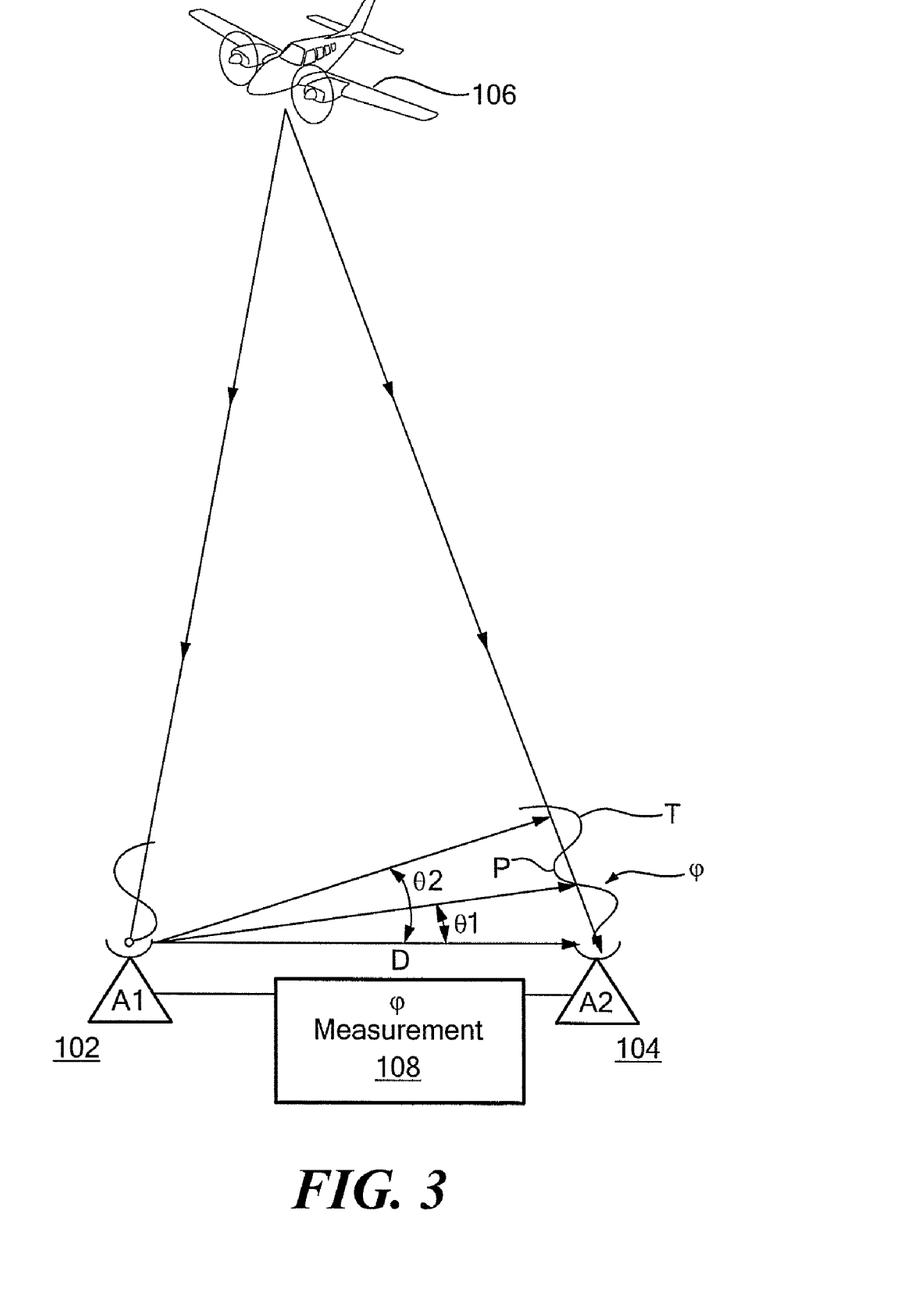
FIG. 3 is a schematic diagram showing target spoofing detection in accordance with exemplary embodiments of the invention.

FIG. 3 shows an exemplary system 100 having first and second ground locations 102, 104 having respective antenna elements A1, A2 to detect spoofing of a target 106 in accordance with exemplary embodiments of the invention. The illustrated embodiment shows a one-dimensional interferometer provided by first and second antennas A1, A2 at the respective ground stations to receive a signal from the target 106 and perform phase comparison. It is understood that any practical number of antenna elements can be used to enhance spoofing detection.

Figure 3A:
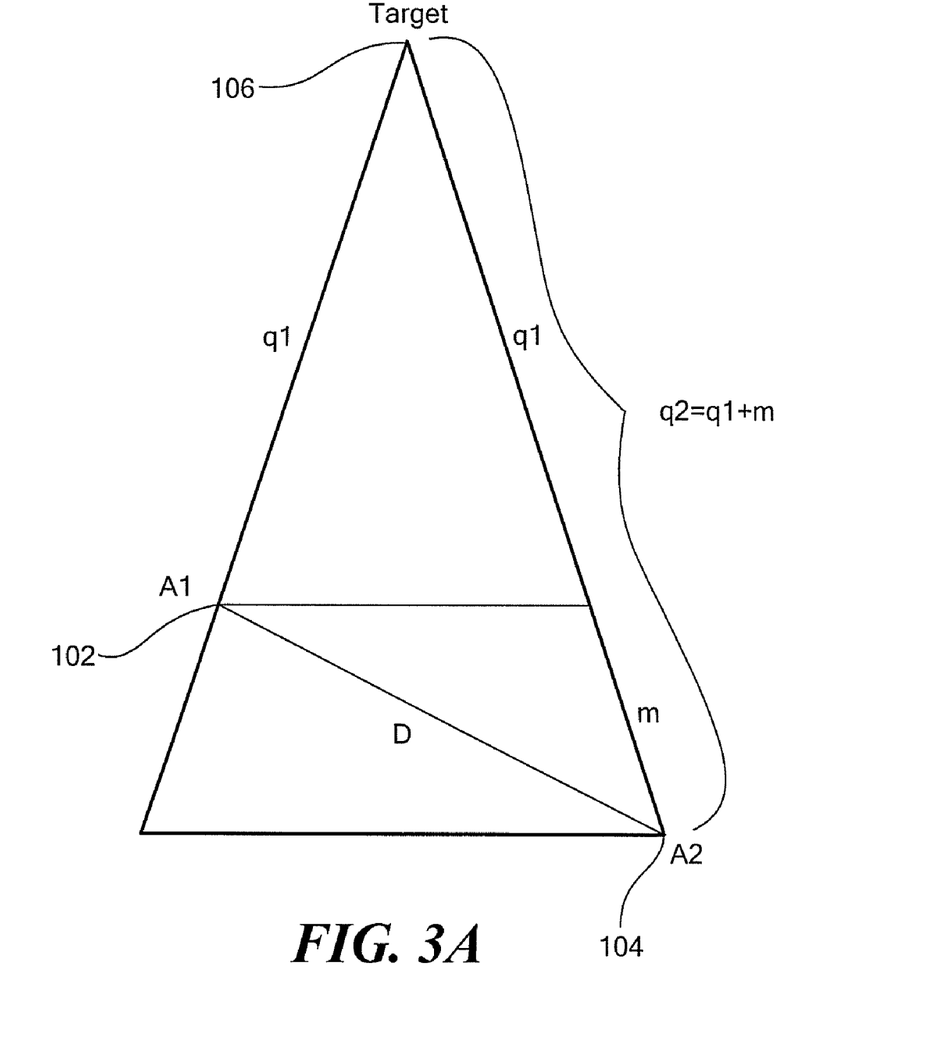
FIG. 3A is a schematic diagram showing further details for target spoofing detection.
Figure 3B:
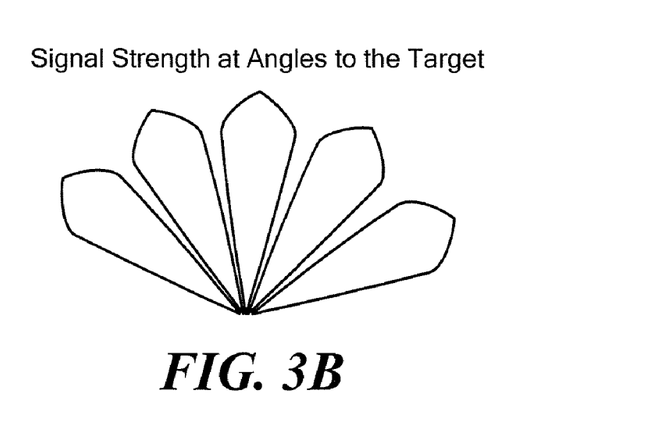
FIG. 3B is a pictorial representation of signal strength for target location.

The signal wave transmitted by the target impinges on the interferometer at an angle not necessarily normal to the antenna elements A1, A2, and is detected by the antenna elements at different times. The signals detected by the antenna elements A1, A2 are compared by a phase measuring mechanism 108 to detect the phase difference φ between the two signals arriving at the antenna elements. When the phase difference is small, the signals add, when the phase difference is near π the signals cancel each other. By comparing the signal strength detected at the interferometer to the signal strength of the antennas separately the target can be placed (independently) at one of a number of positions in space, as shown in FIG. 3B discussed below.

The phase relationship can be described by the speed of light c, the frequency of the signal wave f, and the wavelength λ:

$$c = f\lambda$$

The signal wave travels a distance L in a given time T, where:

$$T = L/c$$

The phase of the signal wave advances through an angle of 2πfT with respect to time zero. The difference between the arrival of the signal at antenna A1 and antenna A2 can be represented by a distance m shown in FIG. 3A. The phase difference is $$\phi = 2\pi\left(\frac{m}{\lambda} - \left\lfloor\frac{m}{\lambda}\right\rfloor\right)$$

where the notation ⌊ ⌋ means floor (that is, the largest integer less than the operand).

Figure 3C:
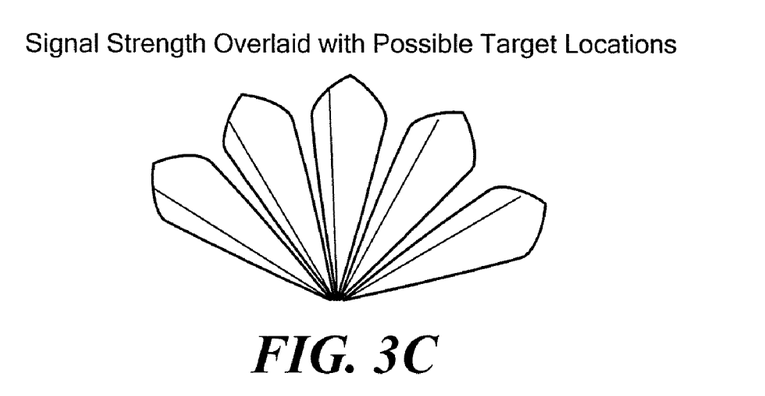
FIG. 3C is pictorial representation of signal strength for target location overlaid with possible target locations.
Figure 3D:
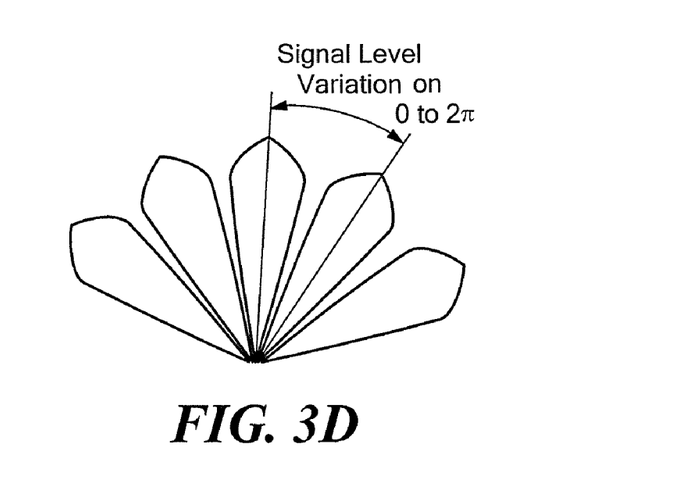
FIG. 3D is a pictorial representation of signal strength for target location and signal variation.

FIG. 3B shows a simplified picture of the signal level out of the interferometer with respect to target location relative to the interferometer. The cyclical nature of phase cause multiple or ambiguous solutions for target locations, as shown in FIG. 3C. FIG. 3D shows how the signal level varies over a cycle (0,2π). Since a signal wave propagates through a distance of 2π radians in each cycle, the direction of arrival θ may be a multiplicity of possible directions of arrival, each of which have identical phase φ. The number of such ambiguities is related to the distance between antennas by $$\left\lceil \frac{4D}{\lambda} \right\rceil,$$

where D is the distance between the antennas, and is assumed to be at least $$\frac{\lambda}{2}$$

and λ is the transmitted wavelength of the signal.

As can be seen, peaks and troughs are generated in the phase difference signal φ as the target 106 moves with respect to the first and second antennas A1, A2 to generate position information for the target. The detected peaks and troughs can be compared to a signal derived from the reported position information for the target to determine spoofing of the target. That is, if the peaks and troughs do not match the peaks and troughs expected based upon the reported position of the target, the target may be spoofing. The peaks correspond to constructive interference of the received signals and the troughs correspond to destructive interference as determined by the wavelength of the signal transmitted by the target.

It is understood that it may not be possible to determine the exact position of the target 106 from the received signal information. However, comparing the computed phase signal with an expected phase signal can determine whether the position of the target reported by the target is plausible. More particularly, the aircraft transmits its GPS location to the ground station, which includes first and second antenna elements. The ground station can use the first and second antenna elements to generate a phase signal for the transmission that can be compared to a phase signal that is computed as if the aircraft really were transmitting from the reported GPS location.

In one embodiment, detection processing computes the actual magnitude of the signal received and compares it with the interferometry signal to determine where in the ambiguity pattern, the target lies. It should be noted that the target cannot spoof the interferometer with respect to angle, since the determination is made only with data that the target cannot control.

The target could try to spoof in range and/or speed, but even these would be very difficult to do when comparing the signal change over time, using the interferometric reports, with the actual reported position. That is, on any given return the target could try to spoof range and/or speed, but looking at these spoofed results over time would make it obvious that the range and/or speed are inconsistent.

Figure 3E:
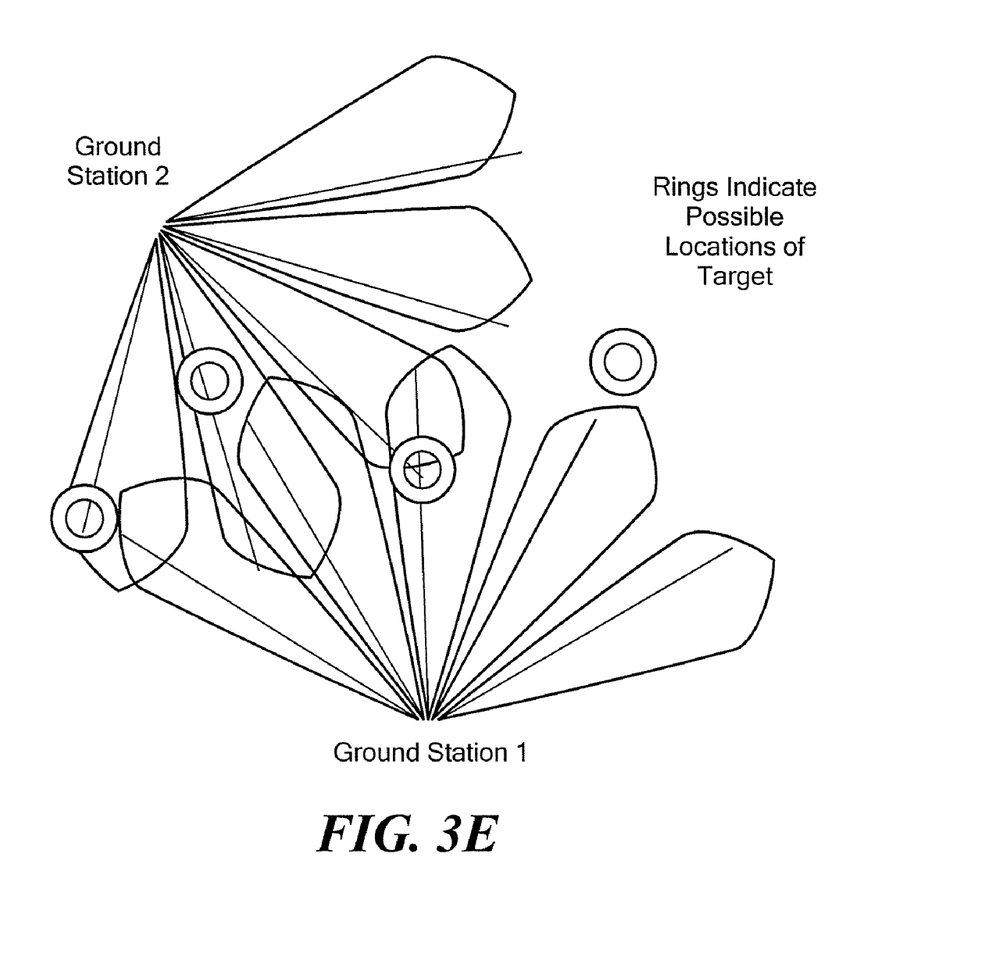
FIG. 3E is a pictorial representation of target location.

It should be noted that it generally takes three ground stations to determine the position of a target that is spoofing its position. Using exemplary embodiments of the invention, two ground stations can quickly determine position because the ambiguity pattern of the two stations cross each other in ways that assure that the target cannot cross space without hitting a series of combined ambiguities that is distinct enough to place the target, as shown in FIG. 3E.

Figure 4:
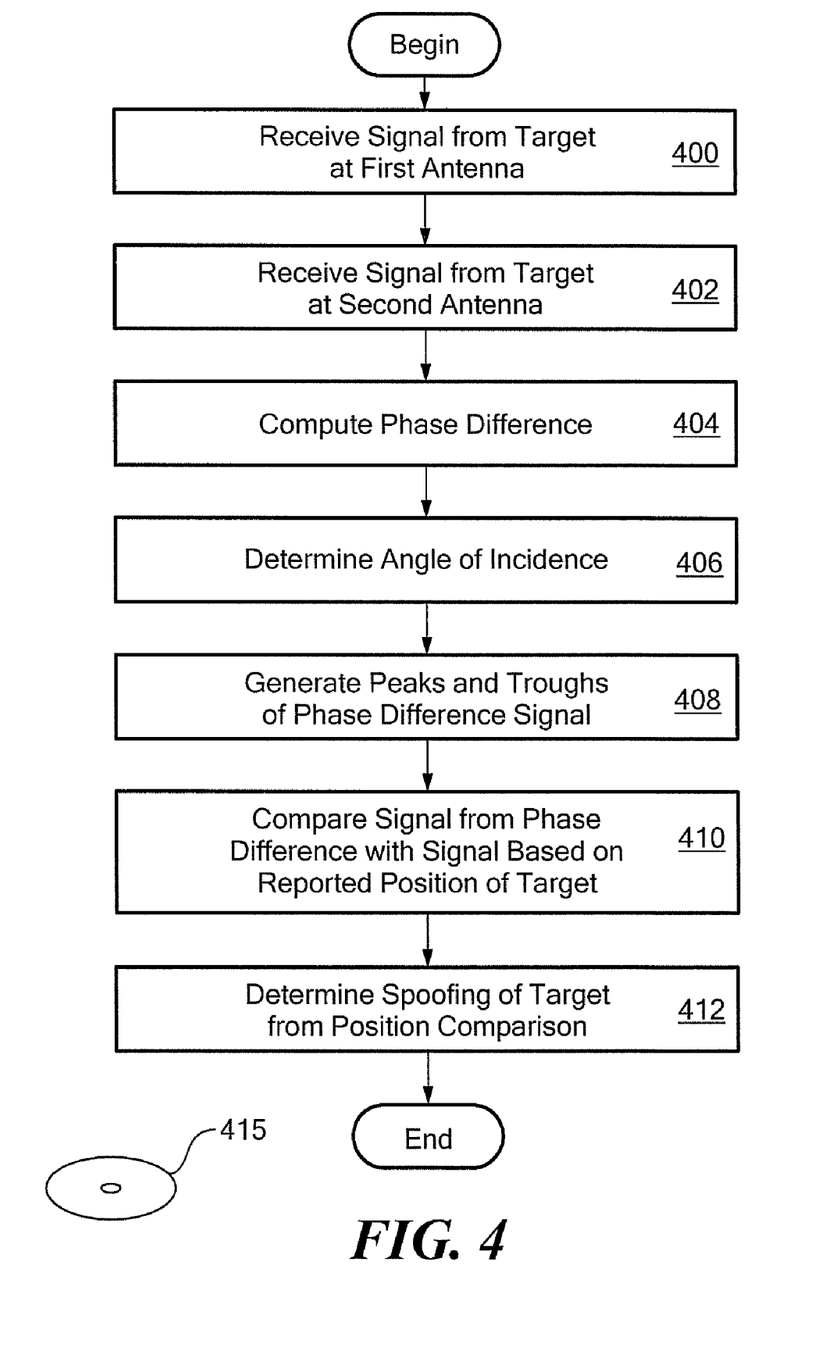
FIG. 4 is a flow diagram showing an exemplary sequence of steps for providing target spoofing detection in accordance with exemplary embodiments of the invention.

FIG. 4 shows an exemplary sequence of steps for providing spoofing detection in an air traffic control system. In one embodiment, processing steps can be provided as computer-readable instructions stored on a disk 415. The instructions enable a machine to perform processing to implement exemplary embodiments of the invention.

In step 400, a signal from a target, such as an aircraft, is received by a first antenna element. In step 402, the signal from the target is received by a second antenna element. A phase difference between the signals received by the first and second antenna elements is computed in step 404. In step 406, an angle of incidence for the signal, which can correspond to multiple target locations, is derived from the phase information. In step 408, peaks and troughs in the phase difference signal are generated due to movement of the target with respect to the antenna elements from which target position information can be derived.

In step 410, the phase difference signal is compared with a signal based upon the position of the target reported by the target. That is, a target that is at the location reported by the target will generate a certain signal, which can be compared against the signals actually received by the antennas A1, A2. In step 412, spoofing is detected when the determined and reported signal information does not match. It is understood that the phase difference signal, or other signal derived from the phase difference signal, can be used for comparison against the received signals.

It is understood that a wide variety of techniques for determining whether positions/signals match can be used. As used herein, the term match refers to a threshold amount(s) and/or parameter(s) that determine a degree of similarity between the positions and/or the peaks and troughs in the computed and reported signals. It is further understood that the phase information can be used to generate a variety of signals to facilitate comparison with a signal(s) generated from the target-transmitted GPS location. In addition, it includes techniques where two ground stations exchange phase information to determine exact location of the target.

Exemplary embodiments of the invention can have various partitions of hardware and software. Alternative embodiments having different apportionment between hardware and software to meet the needs of a particular application will be readily apparent to one of ordinary skill in the art. In addition, the inventive processing can be implemented in computer programs executed on programmable computers/machines that each includes a processor, a storage medium or other article of manufacture that is readable by the processor (including volatile and non-volatile memory and/or storage elements), at least one input device, and one or more output devices.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

In addition, it is understood that exemplary embodiments of the invention include determination of peak and trough, i.e., constructive and destructive interference from the target, as wells as techniques that determine the phase of the target in analog and/or digital implementations.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   receiving a signal from a target at first and second ground stations forming part of an ADS-B air traffic control system;
   determining a phase difference signal between the signal received at the first ground station and the signal received at the second ground station;
   determining peaks and troughs in the phase difference signal due to movement of the target;
   comparing the determined peaks and troughs in the phase difference signal with a phase difference derived from a position of the target reported by the target; and
   identifying spoofing of the target from the comparison of the determined phase different signal and the signal derived from the position of the target reported by the target.

2. The method according to claim 1, further including comparing at selected times the determined peaks and troughs in the phase difference signal with a phase difference derived from a position of the target reported by the target to check for consistency between target reported location and possible target locations.

3. The method according to claim 1, wherein the target is an aircraft.

4. The method according to claim 1, wherein the position of the target reported by the target was reported over a 1090ES link.

5. The method according to claim 1, further including determining possible target locations from the signal received at the first ground station and the signal received at the second ground station.

6. The method according to claim 5, further including determining spoofing of the target if the position of the target reported by the target is not of the possible target locations determined from the signal received at the first ground station and the signal received at the second ground station.

7. An ADS-B air traffic control system, comprising
   an ground station to communicate with aircraft, the ground station including first and second antennas;
   a target spoofing detection module to detect spoofing by an aircraft if a position of the aircraft reported by the aircraft is not one of possible target locations determined from a signal from the aircraft received at the first ground station and received at the second ground station of the ADS-B air traffic control system.

8. The system according to claim 7, wherein the target spoofing detection module is configured to determine a phase difference signal between the signal received at the first antenna and the signal received at the second antenna, compare the determined phase difference signal with a phase difference signal derived from a position of the aircraft reported by the aircraft, and to identify spoofing of the aircraft from the comparison of the determined phase different signal and the signal derived from the position of the aircraft reported by the aircraft.

9. The system according to claim 7, wherein the target spoofing detection module is configured to compare at selected times the determined peaks and troughs in the phase difference signal with a phase difference derived from a position of the aircraft reported by the aircraft to check for consistency between aircraft reported location and possible aircraft locations.

10. The system according to claim 7, wherein the position of the aircraft reported by the aircraft was reported over a 1090ES link.

11. An article, comprising:
    a computer readable medium containing stored instructions that enable a computer to control a machine to perform the steps of:
    receiving a signal from a target at first and second ground stations forming part of an ADS-B air traffic control system;
    determining a phase difference signal between the signal received at the first ground station and the signal received at the second ground station;
    determining peaks and troughs in the phase difference signal due to movement of the target;
    comparing the determined peaks and troughs in the phase difference signal with a phase difference derived from a position of the target reported by the target; and
    identifying spoofing of the target from the comparison of the determined phase different signal and the signal derived from the position of the target reported by the target.

12. The article according to claim 11, further including instructions for comparing at selected times the determined peaks and troughs in the phase difference signal with a phase difference derived from a position of the target reported by the target to check for consistency between target reported location and possible target locations.

13. The article according to claim 11, wherein the target is an aircraft.

14. The article according to claim 11, further including instructions for determining possible target locations from the signal received at the first ground station and the signal received at the second ground station.

15. The article according to claim 14, further including instructions for determining spoofing of the target if the position of the target reported by the target is not of the possible target locations determined from the signal received at the first ground station and the signal received at the second ground station.

* * * * *